UNITED STATES PATENT OFFICE

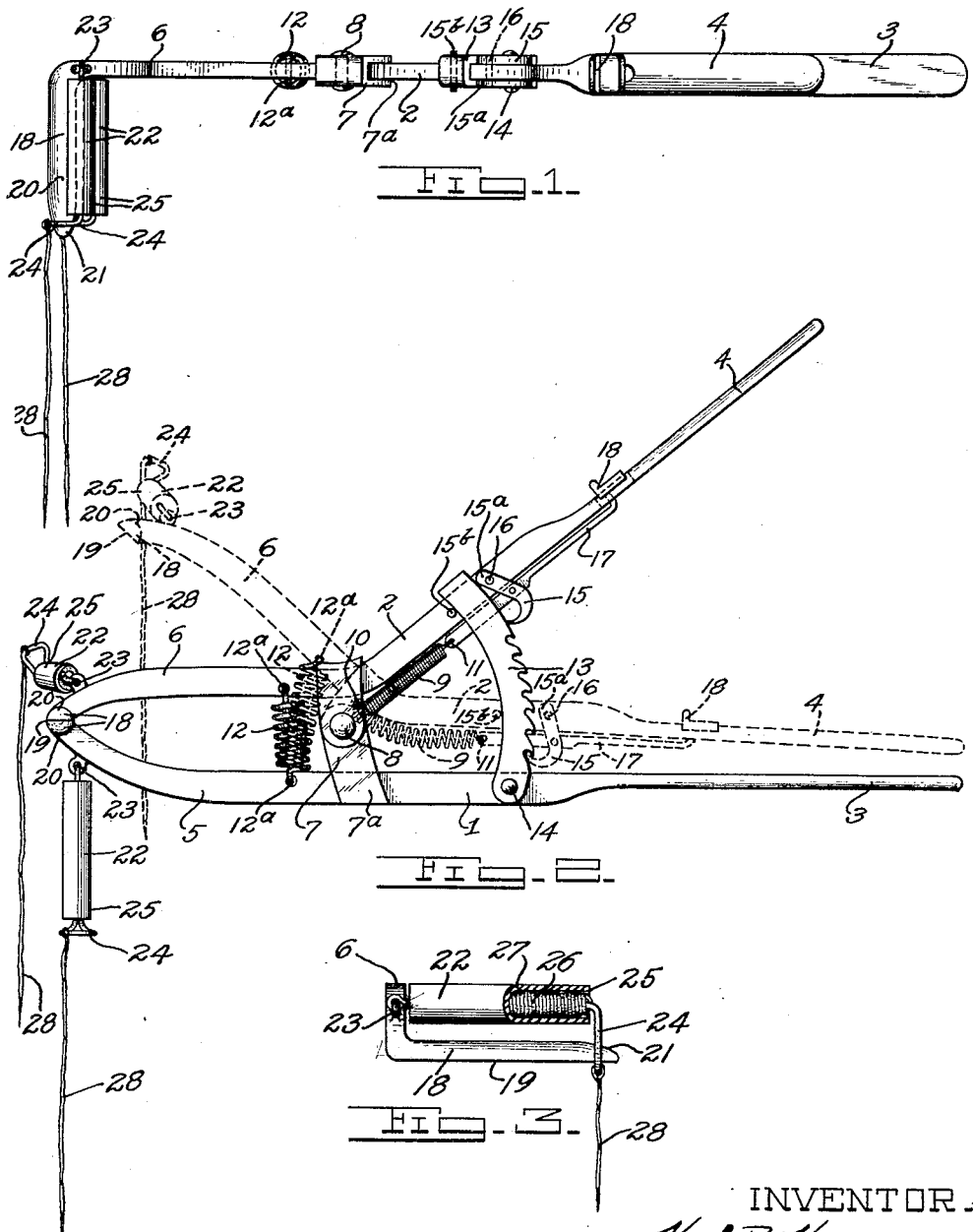

KARL B. HANSON AND JOSEPH S. MIHALEK, OF SARATOGA SPRINGS, NEW YORK

VETERINARY MOUTH SPECULUM

Application filed January 30, 1930. Serial No. 424,604.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by or for the Government for governmental purposes without payment to us of any royalty thereon.

We hereby dedicate the invention herein described to the free use of the public, to take effect upon the granting of a patent to us.

The object of the invention is to provide a forceps type of veterinary mouth speculum for foxes, dogs, and various kinds of furbearing and carnivorous animals in which the mouth can be forced open and held open a series of different distances within the normal range or working limits of the jaw-bone joints or mandibular articulation.

In the accompanying drawings Fig. 1 represents a top view of the speculum; Fig. 2 represents a side elevation of the device, the dotted lines showing the position of the different parts when the jaw members are open; and Fig. 3 represents a detailed view of one of the bit bars and jaw clamps, partly in section.

Referring to the drawings, it will be seen that the speculum comprises members 1 and 2 forming handles 3 and 4 at one end and jaws 5 and 6 at the other end. Members 1 and 2 are braced near their central portions by side bars 7, bolted as at 7a, member 1 being rigidly affixed to the side bars and member 2 being adapted to be pivotally moved as at 8 in the side bars. Member 1 is so constructed that when the handles are in closed position the jaws are open or apart, and when the handles are apart the jaws are in closed position. Spring assembly 9 affixed to one of the side bars 7 as at 10 and to member 17 as at 11 is adapted to hold the handles in open or extended position and the jaws closed, and another spring 12, affixed as at 12a, to the upper and lower jaw members 5 and 6 also helps to normally hold the jaws 5 and 6 firmly together, which thereby prevents the bit bars, hereinafter described, from separating when the speculum is placed in an animal's mouth and which tends to eliminate trouble in getting the speculum properly placed in the mouth.

An automatic arcuate ratchet bar 13, bolted as at 14, to handle 3 is provided for the purpose of locking the handles and holding the jaws open at the desired deflection. A pawl or dog 15 is pivotally affixed to handle 4 as at 16 and is adapted to engage the notches in bar 13. This pawl is bolted to bar 17 of spring assembly 9 and the movement of this bar by thumb releasing member 18 disengages pawl 15 from bar 13. Pawl 15 has an extension 15a that contacts with bar 13 and holds bar 13 against post 15b affixed to and extending from member 2 and thereby prevents dog 15 from catching or butting the teeth of ratchet 13 when the operator of the speculum decreases the interval between the bit bars, hereinafter described.

Bit bars 18 are provided at the ends of the jaws and project laterally therefrom. This is to facilitate proper placement of the bit bars across the interdental space by merely inserting them from one side of the mouth, even though the animal is holding its mouth shut when the instrument is first being applied. These bit bars are flattened on one face 19 and round on the other face 20 and they are tapering at the outer ends 21 so as to have the bit bars comprise a smooth, tapering, round-pointed, circular rod, when they are in contact with each other, when the jaws are in closed position. This construction of the bit bars is to facilitate their being easily inserted into the mouth across the interdental space, as well as for the purpose of decreasing the danger of injuring the gums and mouth of the animal when the instrument is being used. Members 1 and 2 are so constructed that when the handles are moved from open to closed position, the bit bars describe an arc coinciding with that described by the interdental space of an animal, thereby preventing either of the bit bars from sliding backward or forward over the interdental space when the mouth of the animal is being opened or closed.

A coil spring jaw clamp 22 is provided for each bit bar, the function of which is to hold each jaw of the animal securely to its own respective bit bar. Jaw clamps 22 are freely swinging and may be attached to the jaws 5 and 6 as at 23. A metal loop or hook 24 is provided at the outer end 25 of each jaw clamp to permit of the fastening or hooking of each jaw clamp to its respective bit bar. The coiled spring 26 of the jaw clamp is covered with rubber tubing 27 or other suitable protective material to prevent the hair and skin of the animal from being pinched between the coils of the spring when the device is in use. A piece of lacing or string 28 may be fastened in the loop or hook 24 so as to control the movement of each jaw clamp and thereby eliminate the danger to the operator of the device of having his hands bitten or scratched by the animal when applying the speculum to or removing the same from an animal's mouth.

We claim:

A veterinary mouth speculum of the character described comprised of cooperating members shaped at one end of each into handles, the opposite ends being in the form of jaws, side bars connecting and bracing said cooperating members near their central portions, one cooperating member being rigidly affixed to the side bars and the other cooperating member adapted to being pivotally moved between said side bars, tapered bit bars positioned at the ends of said jaws and projecting laterally therefrom to facilitate their insertion across the interdental space of an animal's mouth, although closed, and from one side of the mouth, a spring fashioned to hold said handles in an open position, means to hold said bit bars together while being placed in the animal's mouth, coil spring jaw clamps attached to said bit bars fashioned to hold each jaw of an animal securely to a bit bar, and an automatic ratchet assembly so made as to control the desired deflection of said jaws, the speculum being constructed so that when the handles are in a closed position the jaws are open and when the handles are apart the jaws are in a closed position, the instrument being adapted to being applied from the side of the animal to be treated.

KARL B. HANSON.
JOSEPH S. MIHALEK.